US007623934B2

(12) United States Patent
Iefuji et al.

(10) Patent No.: US 7,623,934 B2
(45) Date of Patent: Nov. 24, 2009

(54) HAND-HELD CONTROLLER WITH EXTERNAL LIGHT SOURCE

(75) Inventors: Nobuhiko Iefuji, Yamatokoriyama (JP); Yasuhide Ota, Yamatokoriyama (JP)

(73) Assignee: Mori Seiki Co., Ltd., Yamatokoriyama-shi, Nara (JP)

( * ) Notice: Subject to any disclaimer, the term of this patent is extended or adjusted under 35 U.S.C. 154(b) by 176 days.

(21) Appl. No.: 11/609,869

(22) Filed: Dec. 12, 2006

(65) Prior Publication Data

US 2007/0168061 A1 Jul. 19, 2007

(30) Foreign Application Priority Data

Dec. 13, 2005 (JP) ............................ 2005-358471

(51) Int. Cl.
*G06F 19/00* (2006.01)
*G05B 15/00* (2006.01)

(52) U.S. Cl. .......................... 700/83; 700/85; 700/180; 700/245; 901/3

(58) Field of Classification Search ................... 700/83, 700/85, 180, 245; 901/3
See application file for complete search history.

(56) References Cited

U.S. PATENT DOCUMENTS 4,380,796 A * 4/1983 Ostby ........................ 700/169
6,046,893 A * 4/2000 Heravi ........................ 361/23
6,134,102 A * 10/2000 Worn et al. ................ 361/680
2005/0033479 A1 * 2/2005 Parker ....................... 700/282
2006/0009879 A1 * 1/2006 Lynch et al. ............... 700/245
2006/0189347 A1 * 8/2006 Bollman et al. .......... 455/556.1

* cited by examiner

*Primary Examiner*—Michael D Masinick
(74) *Attorney, Agent, or Firm*—Westerman, Hattori, Daniels & Adrian, LLP

(57) ABSTRACT

A manual pulse generator (1) attached to the control panel of a machine tool made up of: a spindle mechanism for holding a tool; a workpiece mounting mechanism; a feed mechanism for moving the spindle mechanism relative to the workpiece mounting mechanism along three orthogonal X-axis, Y-axis and Z-axis paths, a control device for controlling the feed mechanism, a control panel having control keys and a keyboard for inputting various types of data to the control device, and a display for displaying on a screen control state resulting from the control device. The manual pulse generator (1) is provided with a control section (11) for inputting a pulse signal to the control device, and a light-emitting diode (15) for illumination, which is provided on an upper surface thereof to emit light upwardly, and which lights only when a pulse signal can be input to the control device.

4 Claims, 4 Drawing Sheets

HAND-HELD CONTROLLER WITH EXTERNAL LIGHT SOURCE

BACKGROUND OF THE INVENTION

1. Technical Field

The present invention relates to a hand-held controller connected to a control device for controlling the operating mechanism unit of a machine, and used by being gripped by an operator when the operating mechanism unit is manually controlled.

2. Description of the Related Art

Machine tools, for example, have lighting devices as appropriate for easily performing work when an operator carries out various tasks, such as checking machining of workpieces, and checking operations of tools and the workpieces. One example that is known of such a lighting device is that disclosed in Japanese Unexamined Pat. App. Pub. No. 2005-28461.

The lighting device is made up of: a bowl-shaped lighting cover that is open at either end, with the upper portion having a small diameter, and the lower portion having a large diameter; an illumination lamp formed into a loop and arranged coaxially with the upper opening and the lower opening of the lighting cover; a bracket for supporting the illumination lamp on the inner surface of the lighting cover; a magnet provided on an upper-end surface of the lighting cover; and a protection member for covering the illumination lamp to protect it from chips and cutting fluid. In a machine tool such as a vertical machining center, the lighting device is attached to a lower-end surface of the spindle head by means of the magnet, with the spindle and the tool being inserted through the upper and lower openings of the lighting cover, and the central aperture of the illumination lamp.

According to this lighting device, the illumination lamp is attached to the machine tool with the spindle inserted into the central aperture of the illumination lamp, wherein the lamp is in a placement in which the light shining from the lamp is shielded by the spindle and the tool, preventing shadows from the spindle and the tool from being produced on the surface of the workpiece, which results in an environment that facilitates work for the operator.

However, the above described conventional lighting device, since it is fixed to the machine tool, has entailed the problem that due to other structures (the supply nozzle for supplying cutting fluid to a contact portion between the tool and the workpiece, for example) arranged between the illumination lamp and the workpiece, shadows are bound to be produced on the surface of the workpiece, creating areas where visual checking is impaired, and has also entailed the problem that it is bright directly below and around the lighting device, yet dark in areas apart from that, which can impair an operator's work.

Furthermore, although the areas where visually checking is hampered can be prevented by an operator illuminating a desired area with a suitable small portable lighting device, in a situation, for example, in which an operator manually controls a machine tool with a manual pulse generator, a suitable small portable lighting device cannot be employed.

BRIEF SUMMARY OF THE INVENTION

In view of the foregoing, an object of the present invention is to provide a hand-held controller with an illumination function which allows easy performance of various jobs by illuminating a desired area even when the operating mechanism unit of the machine is manually operated.

For attaining the aforementioned object, the invention relates to a hand-held controller which is connected to a control device for controlling an operating mechanism unit of a machine, and used so as to be held by an operator when the operating mechanism is manually operated, comprises a control section for inputting a control signal relating to a operational control of the operating mechanism to the control device, and an illumination light source for outwardly emitting light from the controller.

According to the present invention, the operator inputs a control signal to the control device from the control section of the hand-held controller to cause the operating mechanism to perform the movement according to the input control signal under the control by the control device, and inputs a control signal to the control device from the control section of the controller to teach and set a shift position, etc. of the operating mechanism while efficiently and reliably advancing various jobs by illuminating a desired area with the light emitted from the illumination light source.

Furthermore, various operations under the light shone from the hand-held controller is not limited to a case that a manual operation by means of the controller is performed, and the various jobs may be performed by utilizing the light except for when the manual operation by means of the controller is performed.

It is possible for the light source to light when a lighting switch provided on the machine or the hand-held controller is turned on. The time when the lighting switch is turned on here includes a time not only when a dedicated lighting switch for illuminating the light source is turned on but also when other switches are operated, that is, a power supply of the controller is turned on. If so, the lighting status of the light source can be controlled, to enable improving the ease-of-use of the controller. Also, if the light source is operatively connected with another switch, the operator can be notified of the control state by the relevant switch, depending on whether or not the light source lights.

It is possible for the light source to light only when a control signal can be input to the control device from the control section. Here, in a case that an interlock for malfunction protection is provided in the hand-held controller and the machine, the time when a control signal can be input to the control device from the control section means when conditions except for the interlock required to enable a control signal from the control section to be input to the control device are satisfied independent of whether or not the interlock is valid or invalid.

If so, depending on whether or not the light source lights, it is possible to notify the operator whether a control signal can be input from the hand-held controller, that is, whether or not a operational control from the controller is possible, and whether or not the shift position can be taught and set. Thus, it is possible to prevent an accident from occurring through the carelessness of an operator, and safely operate the operating mechanism.

The hand-held controller can be formed boxlike, the control section is provided on a front of the controller, and the light source is provided on a part facing the operating mechanism on an outer surface of the controller when an operator holds and operates the controller. If so, it is possible to easily eradiate a desired area in front of the operator, which makes it easy to perform various operations using the controller.

The light source can comprise a light-emitting diode. Light-emitting diodes have characteristics like less power consumption and long life, and are suitable for application as illumination light sources. It is preferable that as light-emitting diodes, a high-luminance one, called high-intensity light-emitting diode, is employed, which allows more effective lighting.

The machine can be a machine tool, and the hand-held controller a manual pulse generator. Also, the machine can be a robot, and the hand-held controller a teaching box.

According to a hand-held controller involving to the present invention, even if a manual operation is conducted with the operating device, a desired area can be illuminated with the illumination light source provided on the operating device, capable of efficiently and reliably advancing various jobs.

DETAILED DESCRIPTION OF THE INVENTION

Figure 1:
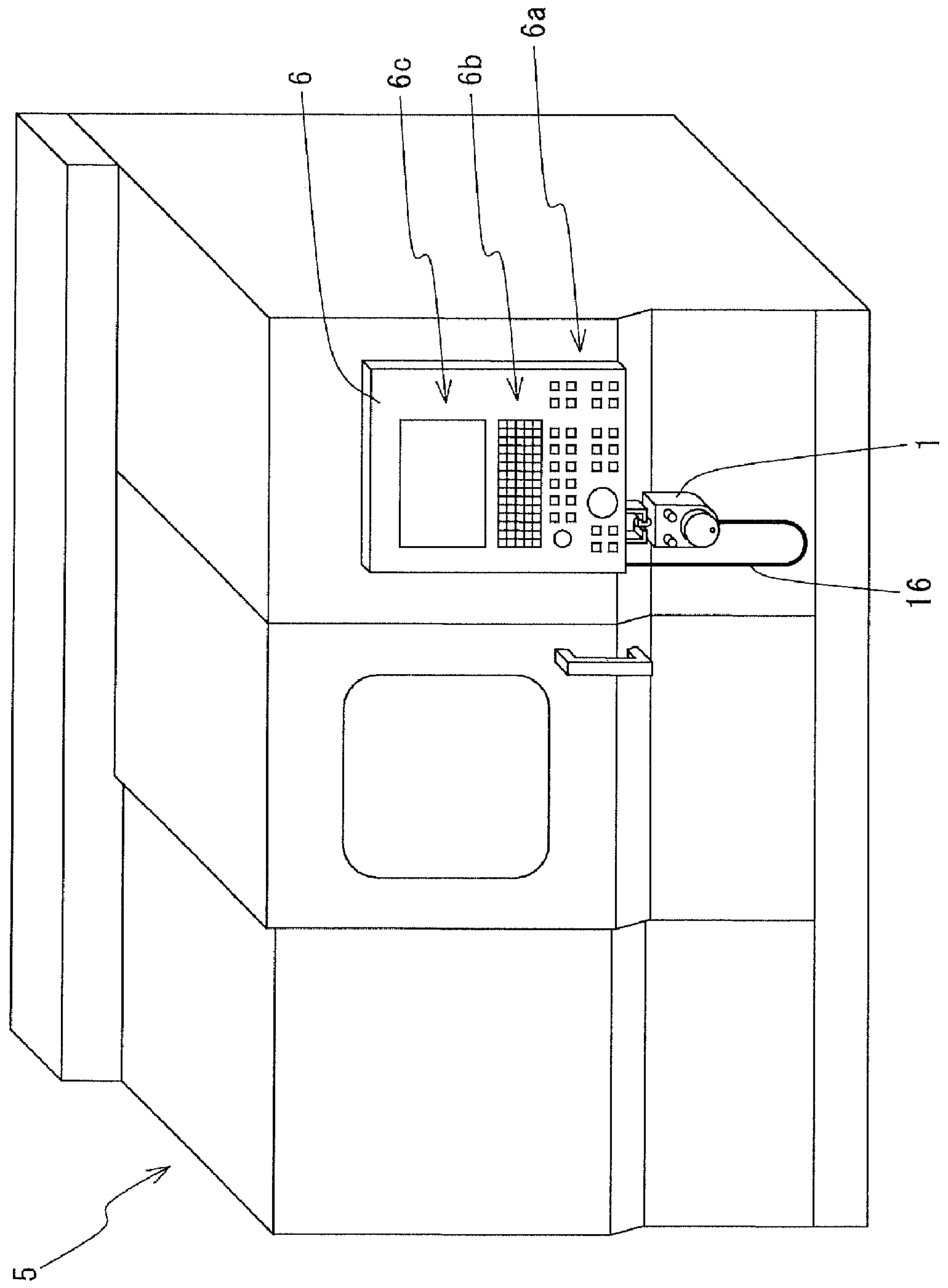
FIG. 1 is a schematic perspective view showing a machine tool furnished with a manual pulse generator according to one embodiment of the present invention.
Figure 2:
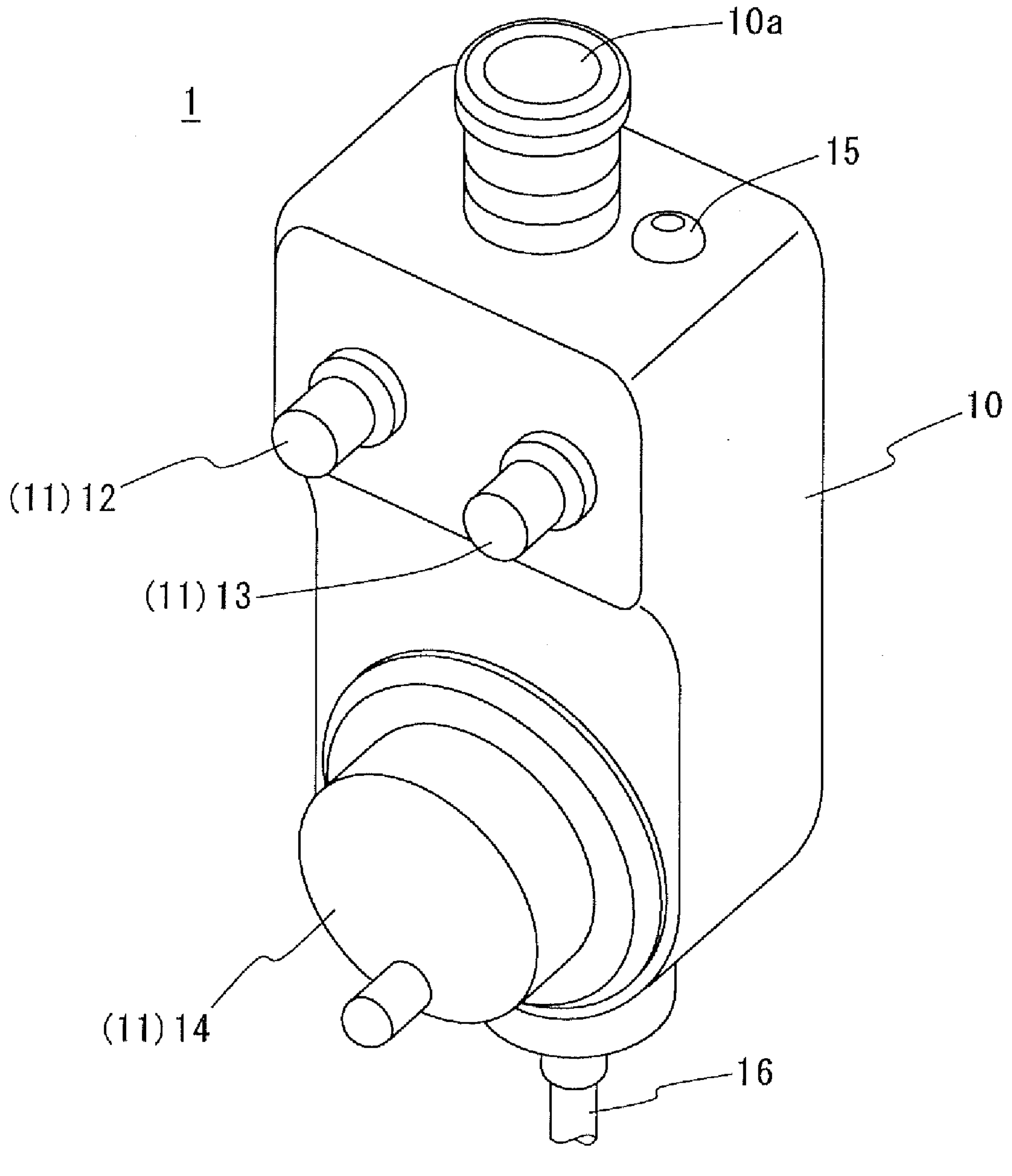
FIG. 2 is a perspective view showing the manual pulse generator shown in FIG. 1.
Figure 3:
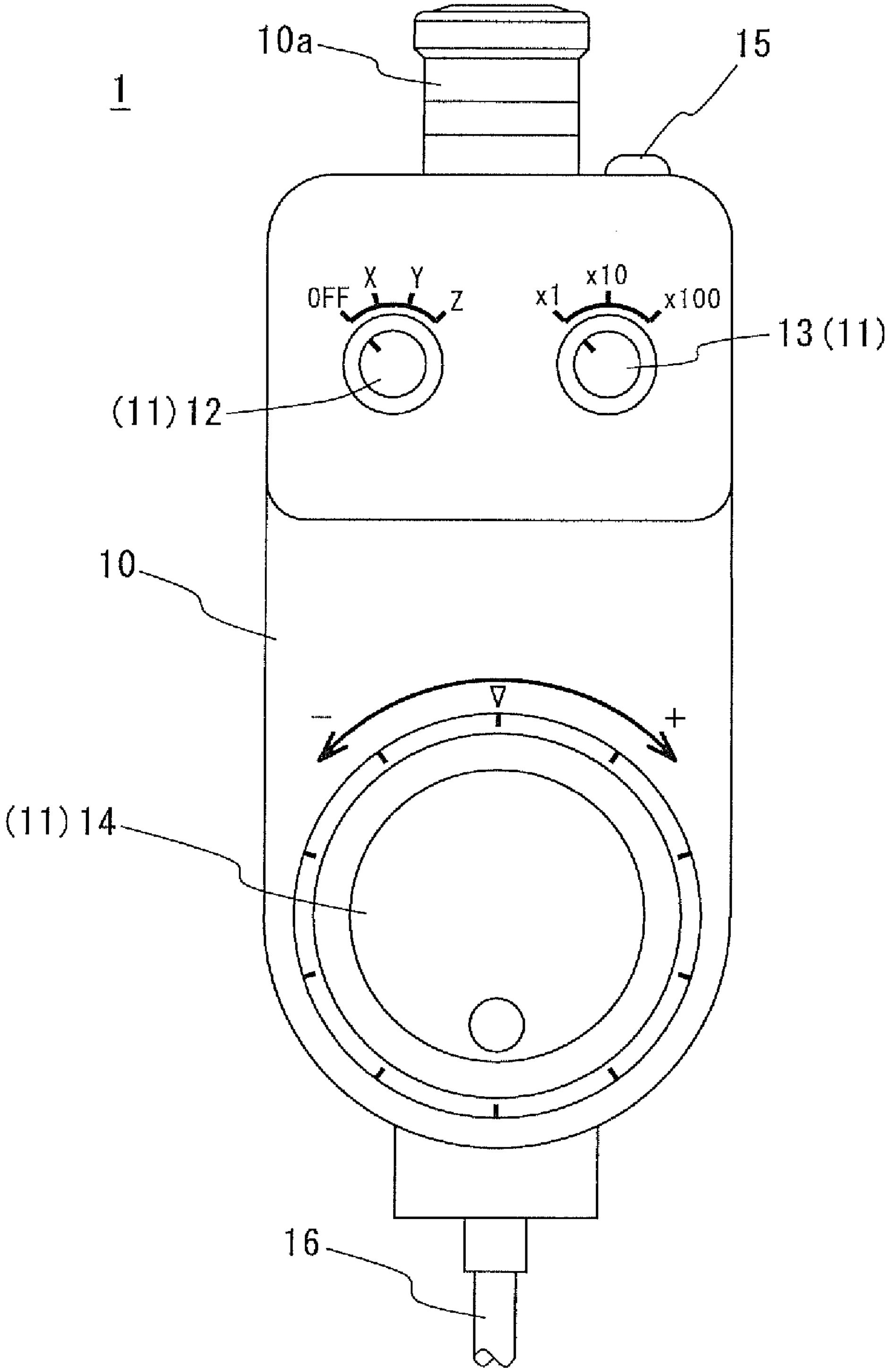
FIG. 3 is a front view showing the manual pulse generator shown in FIG. 1.

In what follows, the preferred embodiment of the present invention is described with reference to the accompanying drawings. FIG. 1 is a schematic perspective view showing a machine tool furnished with a manual pulse generator according to one embodiment of the present invention. FIG. 2 is a perspective view showing the manual pulse generator shown in FIG. 1. FIG. 3 is a front view showing the manual pulse generator shown in FIG. 1.

As shown in FIG. 1 to FIG. 3, a manual pulse generator (hand-held controller) 1 of this example is attached to a control panel 6 of a machine tool (machine) 5 made up of a spindle mechanism (not illustrated) for holding a tool, a workpiece attachment mechanism (not illustrated) to which a workpiece is attached, a feed mechanism (not illustrated) for relatively moving the tool and the workpiece by relatively moving the spindle mechanism (not illustrated) and the workpiece attachment mechanism (not illustrated) along three orthogonal X-axis, Y-axis and Z-axis directions, a control device (not illustrated) for controlling an operation of the feed mechanism, and the control panel 6 including control keys 6*a* and a keyboard 6*b* for inputting various types of data to the control device and a display 6*c* for displaying a control state by the control device on the screen. The manual pulse generator 1 comprises a control section 11 for inputting a pulse signal (control signal) to the control device and a light-emitting diode 15 for illumination.

The control panel 6 is also provided with an operation mode selecting switch for switching an operation mode between an automatic operation based on an NC program, a first manual operation based on an input from the control keys 6*a* and the keyboard 6*b*, and a second manual operation based on a pulse signal from the manual pulse generator 1. The control device controls the feed mechanism on the basis of the NC program if the automatic operation is selected, on the basis of the data input from the control keys 6*a* and the keyboard 6*b* if the first manual operation is selected, and on the basis of the pulse signal input from the manual pulse generator 1 if the second manual operation is selected, so that the spindle mechanism (tool) and the workpiece attachment mechanism (workpiece) relatively move. Furthermore, the spindle mechanism, the workpiece attachment mechanism and the feed mechanism function as an operating mechanism set forth in Claims.

The manual pulse generator 1 is used so as to be held by an operator, and provided with the control section 11 on a front surface of a main body 10 formed boxlike, the light-emitting diode 15 on an upper surface of the main body 10, and a cancel button (not illustrated) on a side surface of the main body 10 for canceling (disabling) interlock for malfunction protection.

The control section 11 is made up of a hand-held switch 12 for selecting to which feed direction the spindle mechanism (tool) and the workpiece attachment mechanism (workpiece) are relatively moved, in the X-axis, Y-axis or Z-axis direction, a magnification changeover switch 13 for switching a travel per pulse, and a pulse handle 14 rotatably provided about the axis vertical to the front of the main body 10 for generating a pulse signal depending on the amount of rotation when being rotated about the axis. The pulse signal generated by the pulse handle 14 is input to the control device when the cancel button is pushed to make the interlock invalid. Furthermore, the hand-held switch 12 is set with a shift position of "Power OFF."

The light-emitting diode 15 is for emitting an illumination beam upward (toward the machine tool 5 when the manual pulse generator 1 is held and operated by the operator), and the lighting status thereof is controlled by the control device. Specifically, the light-emitting diode 15 lights only when a pulse signal can be input to the control device, that is, in a case that the operation mode is the second manual operation and the shift position of the hand-held switch 12 is set to the positions except for the "Power OFF" so as to be turned on. Furthermore, it is preferable that as the light-emitting diode 15, a high-intensity one called "high-intensity light-emitting diode" is generally used, and this makes it possible to realize more effective lighting.

It should be noted that in this embodiment, when conditions other than the interlock are satisfied to enable a pulse signal to be input into the control device irrespective of whether or not the interlock is valid or invalid, it is determined that a pulse signal can be input into the control device to cause the light-emitting diode 15 light, but it is not limited thereto. For example, when the operation mode is the second manual operation, the shift position of the hand-held switch 12 is other than "Power OFF," and the cancel button is pushed to cancel the interlock, that is, when all the conditions including the interlock are satisfied, it is determined that a pulse signal can be input into to the control device to cause the light-emitting diode 15 to light.

Furthermore, an attachment part 10*a* to be attached and detached to and from a lower portion of the control panel 6 is formed on an upper surface of the main body 10, and the communication cable 16, connected to the lower portion of the control panel 6 at one end, is connected to the bottom surface of the main body 10 at the other end.

According to the manual pulse generator 1 of the example configured above set forth, when the operation mode is set to the second manual operation though the operation of the control panel 6, the shift position of the hand-held switch 12 is set to the position corresponding to the feed direction to be moved, and the pulse handle 14 is then rotated, a pulse signal according to the amount of rotation is generated. The feed mechanism is controlled by the control device on the basis of the generated pulse signal, the feed direction selected by the hand-held switch 12, and the magnification selected by the magnification changeover switch 13, so that the spindle mechanism (tool) and the workpiece attachment mechanism (workpiece) relatively move in the selected feed direction by the travel corresponding to the selected magnification and the generated pulse signal. It should be noted that the pulse handle 14 is operated with the interlock canceling button pushed.

In addition, when the operation mode is set to the second manual operation, and the power of the manual pulse generator 1 is turned on, the light-emitting diode 15 lights, and therefore, the operator can perform various jobs, such as relatively moving the tool and the workpiece while illuminating a desired area by the illumination light from the light-emitting diode 15.

Thus, according to the manual pulse generator 1 of the example, even when making a manual operation with the manual pulse generator 1, an operator can perform various jobs while illuminating a work area with the illumination light emitted from the light-emitting diode 15 of the manual pulse generator 1, and thus making possible efficient and reliable work progress.

Additionally, the light-emitting diode 15 is constructed so as to light only when the feed mechanism can be controlled by the manual pulse generator 1, and therefore, it is easily determine by the manual pulse generator 1 whether or not the feed mechanism is controllable depending on whether or not the light-emitting diode 15 lights. This makes it possible to prevent an accident through the carelessness of workers from occurring, and thus relatively move the spindle mechanism (tool) and the workpiece attachment mechanism (workpiece) in safety.

Furthermore, the control section 11 is provided on the front of the main body 10, and the light-emitting diode 15 is provided on the upper surface of the main body 10. Specifically, the light-emitting diode 15 is placed on the outer surface of the main body 10 at the part facing the machine tool 5 when the operator holds and operates the pulse generator 1, and therefore, it is possible to easily illuminate a desired area in front of the operator and thus easily perform various jobs by utilizing the manual pulse generator 1.

In addition, light-emitting diodes 15 are adopted as illumination light sources, and the light-emitting diodes 15 are suitable for the illumination light sources because of its characteristics of less power consumption and long life.

A description is made on one embodiment of the present invention in the foregoing, but a detailed manner in which the present invention may be carried into practice is not limited thereto.

In the previous example, an interlock is provided in the manual pulse generator 1, but the interlock can be omitted. In this case, when the operation mode is the second manual operation, and the power supply of the manual pulse generator 1 is turned on (when a pulse signal can be input to the control device) the light-emitting diode 15 lights.

Furthermore, the light-emitting diode 15 may light when the power supply of the manual pulse generator 1 is turned on regardless of the operation mode. Or, the shift position of "Power OFF" of the hand-held switch 12 is omitted, and the main power supply of the machine tool 5 is turned on to turn the manual pulse generator 1 on. Then, when the operation mode is shifted to the second manual operation to enable a pulse signal to be input into to the control device (with the interlock, when the operation mode is shifted to the second manual operation irrespective of the interlock being valid or invalid, or when the operation mode is shifted to the second manual operation and the interlock canceling button is further pushed), the light-emitting diode 15 may light.

Additionally, a dedicated lighting switch for illuminating the light-emitting diode 15 is provided on the manual pulse generator 1 or the control panel 6, and in response to operation of the switch, the light-emitting diode 15 may be illuminated. Or, irrespective of the operation mode, the light-emitting diode 15 may be illuminated by being operatively connected with another switch. If it is operatively connected with another switch, the control state by the relevant switch can be notified to the operator depending on whether or not the light-emitting diode 15 lights.

Figure 4:
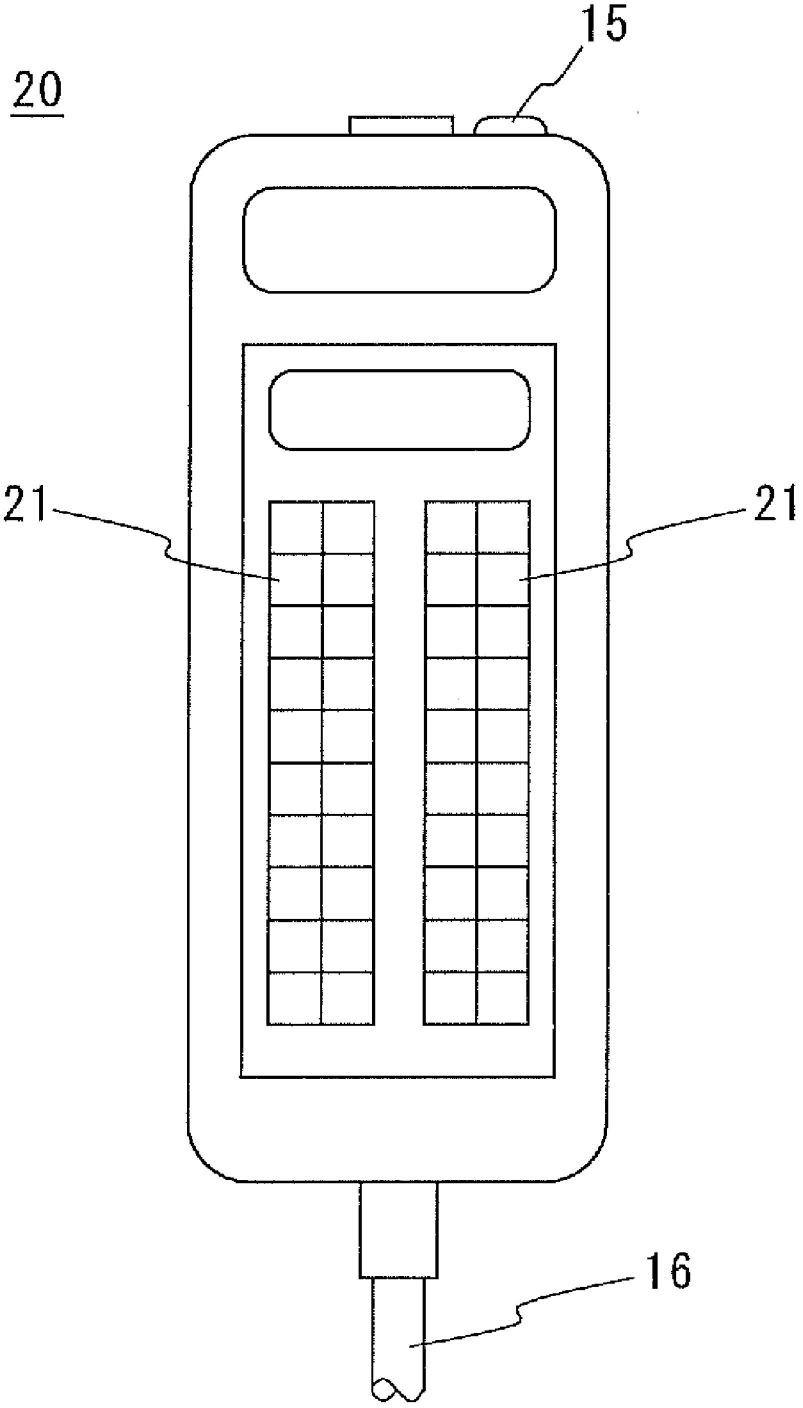
FIG. 4 is a front view showing a teaching box according to another embodiment of the present invention.

Also, in the previous example, the light-emitting diode 15 is provided on the manual pulse generator 1. As another example, the light-emitting diode 15 may be provided on a teaching box 20 shown in FIG. 4 which is connected to a control device for controlling the drive of a robot (machine) with hands and arms (operating mechanism) supporting the hands to move them in a three-dimensional space, and is for teaching and setting a work posture of the robot (arms).

The teaching box 20 is provided with control keys 21 for inputting various data (control signal) to the control device. According to the data input from the control keys 21 to the control device, the arms are moved to adopt a predetermined posture under the control of the control device, and when the predetermined posture is adopted, the positions of the arm on the rotating shaft and the direct-acting shaft may be registered in the control device.

By means of the teaching box 20, the arms adopt a predetermined posture, and the positions of the arms on the rotating shaft and the direct-acting shaft when the predetermined is adopted are registered in the control device. When such operations are repeated to teach and set respective postures of the arms in the series of movements, the robot acts so as to successively adopt the respective taught and set postures under the control of the control device.

In addition, the light-emitting diode 15 of the teaching box 20 lights only when the power supply of the teaching box 20 is turned on, and the data can be input to the control device similarly to the above description.

By means of the teaching box 20 thus constructed also, the operator can conduct his or her job by illuminating it with the illumination light from the light-emitting diode 15 of the teaching box 20, and it is possible to obtain a similar advantage to the foregoing like efficiently and reliably advancing the job.

As an example of the hand-held controller furnished with the light-emitting diode 15, the manual pulse generator 1 and the teaching box 20 are used as described above, but it is not limited thereto. The above mentioned light-emitting diode 15 can be provided in various hand-held controllers which are connected to control devices for controlling operating mechanisms of machines, and used to be held by operators when the operating mechanisms are manually operated.

Additionally, in the previous example, the light-emitting diode 15 is used as an illumination light source, but it is not limited thereto. Other light sources such as halogen lamps, etc. may be used.

Furthermore, that various jobs are done under the light shone from the manual pulse generator 1 or the teaching box 20 is not limited to when a manual operation is performed by utilizing the pulse generator 1 or the teaching box 20. The jobs may also be performed by making the light-emitting diode 15 stay on and utilizing the light except when the manual operation is performed by utilizing the manual pulse generator 1 or the teaching box 20.

In addition, the manual pulse generator 1 can be applied to various types of machine tools, and the teaching box 20 can be applied to various types of robots.

What is claimed is:

1. A hand-held controller for connection to a control device for controlling an operating mechanism unit of a machine, and employed by being gripped by an operator when the operating mechanism unit is manually operated, the controller comprising:

a control section for inputting to the control device control signals relating to operational control of the operating mechanism unit; and an illumination light source for emitting light directed outward of the hand-held controller, wherein:

the hand-held controller is formed boxlike;

said control section is provided on the front side of the hand-held controller;

said light source is provided in an outer peripheral surface of the hand-held controller on a portion thereof oriented toward the operating mechanism unit when an operator grips the controller to operate the controller and operates the control section in a manner facing the operating mechanism unit of the machine to input a control signal to the control device; and said light source is configured so as to light only when the control signal can be input to the control device from the control section and a lighting switch provided either on the machine or on the hand-held controller is turned on.

2. A hand-held controller according to claim 1, wherein said light source comprises a light-emitting diode.

3. A hand-held controller according to claim 1, wherein:

the machine is a machine tool; and the hand-held controller is a manual pulse generator.

4. A hand-held controller according to claim 1, wherein:

the machine is a robot; and the hand-held controller is a teaching box.

* * * * *